United States Patent
Zhou et al.

(10) Patent No.: US 12,541,387 B2
(45) Date of Patent: Feb. 3, 2026

(54) VIRTUAL MEDIA OFFLOAD IN SMART NETWORK INTERFACE CONTROLLER

(71) Applicant: Dell Products L.P., Round Rock, TX (US)

(72) Inventors: Kai Zhou, Shanghai (CN); YungChin Fang, Austin, TX (US); Zhuo Zhang, Shanghai (CN); Zhen Cao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 1016 days.

(21) Appl. No.: 17/576,436

(22) Filed: Jan. 14, 2022

(65) Prior Publication Data
US 2023/0229470 A1    Jul. 20, 2023

(51) Int. Cl.
*G06F 9/455* (2018.01)

(52) U.S. Cl.
CPC ........... *G06F 9/45558* (2013.01); *G06F 2009/45583* (2013.01); *G06F 2009/45595* (2013.01)

(58) Field of Classification Search
CPC ....... G06F 9/45558; G06F 2009/45583; G06F 2009/45595
See application file for complete search history.

(56) References Cited

U.S. PATENT DOCUMENTS

| | | | |
|---|---|---|---|
| 8,799,997 B2 * | 8/2014 | Spiers | H04L 9/0897 713/2 |
| 10,997,118 B1 * | 5/2021 | Maloy | G06F 9/4401 |
| 2008/0244577 A1 * | 10/2008 | Le | G06F 9/45558 718/1 |
| 2018/0198620 A1 * | 7/2018 | Pearson | H04L 9/3247 |
| 2022/0100544 A1 * | 3/2022 | Voltz | G06F 9/45541 |

* cited by examiner

*Primary Examiner* — Jacob D Dascomb
(74) *Attorney, Agent, or Firm* — Jackson Walker L.L.P.

(57) ABSTRACT

An information handling system may include a host system including at least one processor, and a network interface. The network interface may be configured to: receive, from a remote information handling system, data usable for deployment of an operating system (OS); store the data on a local storage device of the network interface; and mount a virtual storage resource accessible to the host system based on the local storage device, wherein the virtual storage resource includes the data, and wherein the host system is configured to boot from the virtual storage resource.

18 Claims, 3 Drawing Sheets

VIRTUAL MEDIA OFFLOAD IN SMART NETWORK INTERFACE CONTROLLER

TECHNICAL FIELD

The present disclosure relates in general to information handling systems, and more particularly to methods and systems for offloading virtual media in a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs.

For purposes of this disclosure, the terms "SmartNIC" and "DPU" may be used interchangeably.

In some situations, a management controller such as a baseboard management controller (BMC) may implement virtual media functionality, in which an image (e.g., a bootable image file) from a remote file share is mounted locally and appears to a host system as a local drive, allowing for deployment of an operating system (OS) onto the host system or a VM. This feature helps administrators install an OS remotely on a server, and it may also be used for various other tasks.

However, the performance and stability of such virtual media implementations could be improved. For example, this management-controller-based approach can be impacted by slow file accesses on the remote file shares during OS installation. Further, the virtual media device exposed to the host system is typically emulated by software running on the management controller processor, which has limited processing power and can achieve only limited throughput for the emulated storage device.

This disclosure thus presents methods for offloading virtual media functionality from the management controller to a SmartNIC, which may be used for OS deployment as well as other purposes. A media image may be pre-loaded onto the on-board storage of a SmartNIC to ensure reliability during deployment. Further, the emulation of virtual media on a SmartNIC is typically much faster than a management controller due to the SmartNIC's high-speed host interface, hardware accelerators, and more powerful computational resources. With this approach, the performance and stability of OS deployment from virtual media may increase significantly.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing SmartNIC technology within an information handling system may be reduced or eliminated.

In accordance with embodiments of the present disclosure, an information handling system may include a host system including at least one processor, and a network interface. The network interface may be configured to: receive, from a remote information handling system, data usable for deployment of an operating system (OS); store the data on a local storage device of the network interface; and mount a virtual storage resource accessible to the host system based on the local storage device, wherein the virtual storage resource includes the data, and wherein the host system is configured to boot from the virtual storage resource.

In accordance with these and other embodiments of the present disclosure, a method may include a network interface of a host system receiving, from a remote information handling system, data usable for deployment of an operating system (OS); the network interface storing the data on a local storage device of the network interface; and the network interface mounting a virtual storage resource accessible to the host system based on the local storage device, wherein the virtual storage resource includes the data, and wherein the host system is configured to boot from the virtual storage resource.

In accordance with these and other embodiments of the present disclosure, an article of manufacture may include a non-transitory, computer-readable medium having instructions thereon that are executable by a processor of a network interface of a host system for: receiving, from a remote information handling system, data usable for deployment of an operating system (OS); storing the data on a local storage device of the network interface; and mounting a virtual storage resource accessible to the host system based on the local storage device, wherein the virtual storage resource includes the data, and wherein the host system is configured to boot from the virtual storage resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
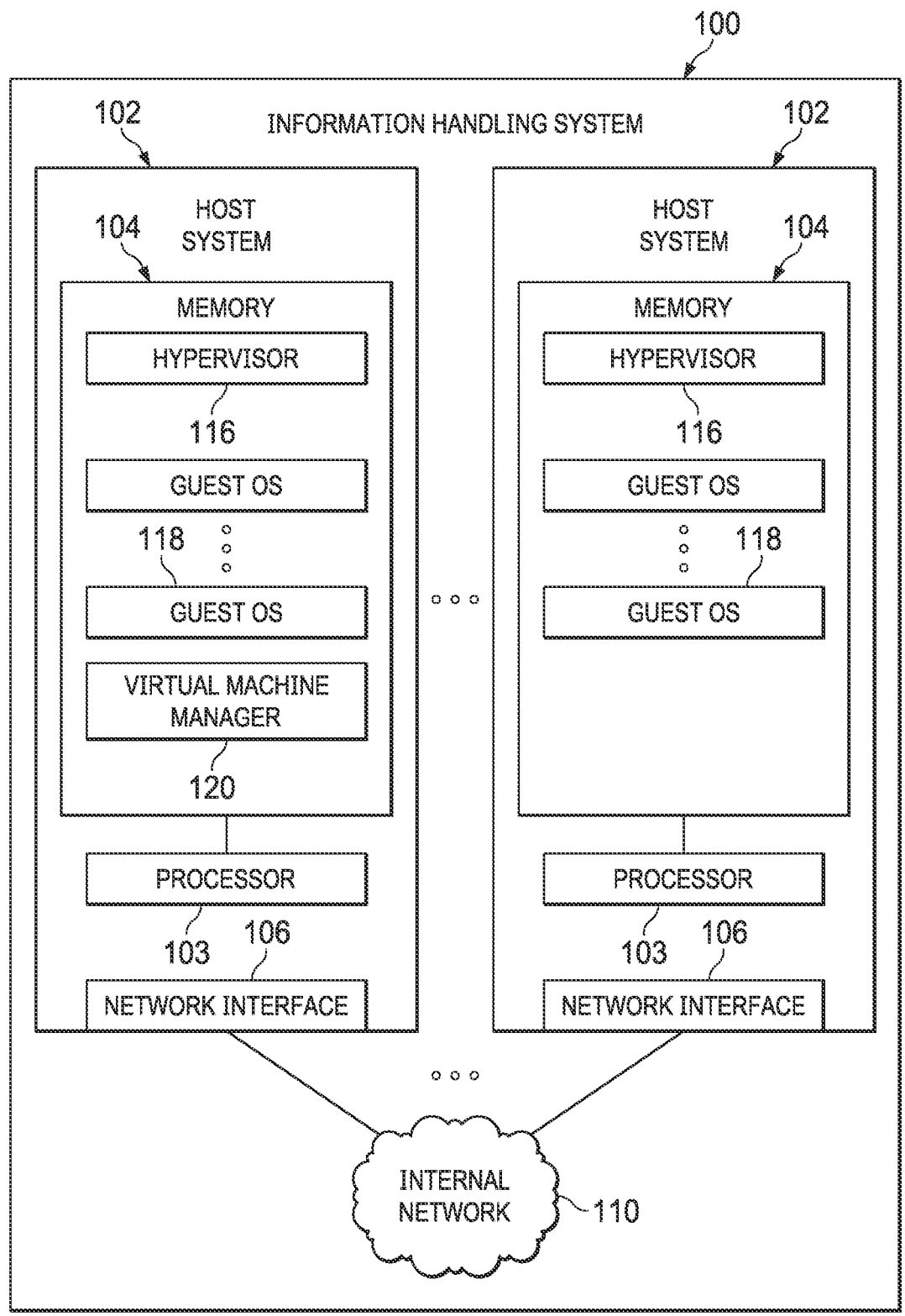
FIG. 1 illustrates a block diagram of selected components of an example information handling system, in accordance with embodiments of the present disclosure.
Figure 2:
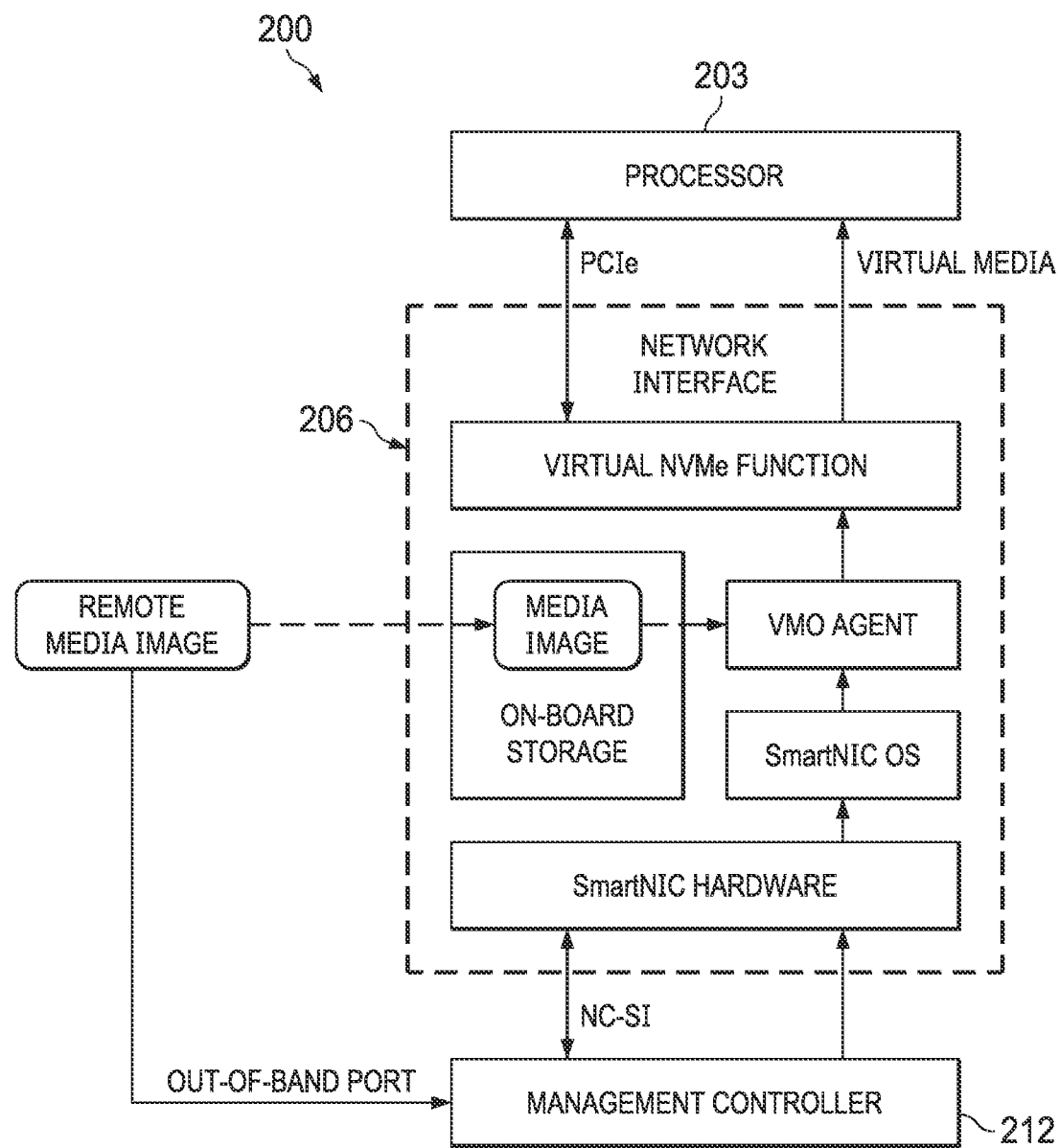
FIG. 2 illustrates a block diagram of selected components of an example information handling system, in accordance with embodiments of the present disclosure.
Figure 3:
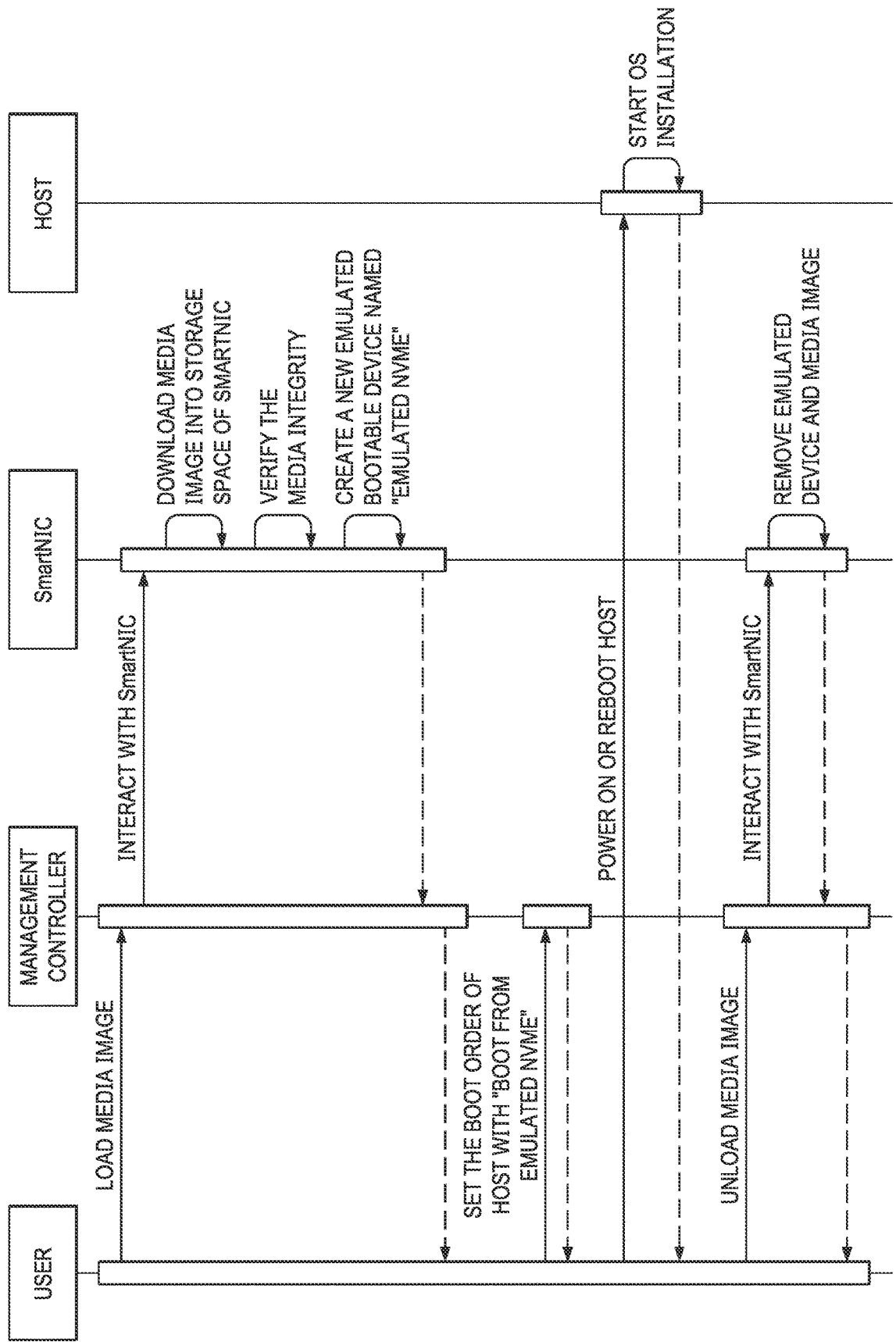
FIG. 3 illustrates a sequence diagram, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may allow for offloading virtual media functionality from a management controller to a SmartNIC.

Turning now to FIG. 2, a block diagram of selected components of an information handling system 200 is shown, according to some embodiments. Information handling system 200 may include host system processor 203, management controller 212, and network interface 206, which may be a SmartNIC. Network interface 206 may include various specialized elements such as processors, memory, etc., referred to generally as SmartNIC hardware. Network interface 206 may also include on-board storage, a SmartNIC OS, a virtual media offload (VMO) agent running on the SmartNIC OS, and other components.

Network interface 206 may be coupled to processor 203 via a Peripheral Component Interconnect Express (PCIe) interface. Additional communication pathways may also be present as well, in some embodiments. For example, while network interface 206 itself may be exposed to processor 203 as a network interface or SmartNIC, the on-board storage of network interface 206 may be separately exposed to processor 203 as a virtual storage resource. For example, the on-board storage may be emulated to appear as a Non-Volatile Memory Express (NVMe) storage device that may be exposed to processor 203 via a virtual NVMe function over the PCIe link in some embodiments.

Information handling system 200 may also include a management controller 212 such as a BMC, which may be communicatively coupled to network interface 206 via a network controller sideband interface (NC-SI), as well as other components in various embodiments.

BMCs usually have limited storage capacity, which may require the virtual media image to be mounted from a remote file share. In contrast, network interface 206 may be equipped with larger on-board storage which can store the entire media image locally. To ensure reliability during OS deployment, the media image may be downloaded to the on-board storage of network interface 206 (e.g., via either NC-SI or an Ethernet port on network interface 206) prior to deployment.

Management controller 212 may interact with network interface 206 to control this process in some embodiments. For example, an administrator may remotely couple to management controller 212 to initiate the OS deployment process. Management controller 212 may then instruct network interface 206 to download the remote media image and expose it to processor 203 as a virtual drive, change the boot order on the host system to cause it to boot from the virtual drive, etc.

Network interface 206 may enable hardware-accelerated virtualization of NVMe storage by emulating an NVMe drive on the PCIe bus. The VMO agent may expose a remote virtual media image to appear to processor 203 as a local NVMe solid-state drive (SSD) in one embodiment.

In some embodiments, different modes may be used for booting processor 203 from the virtual media that is exposed by network interface 206. In one embodiment, a direct file copy mode may be used. For example, if the media image is bootable at the file level, the VMO agent may extract and copy files to the emulated device. In this mode, network interface 206 may add additional boot customizations to the OS installer, such as kernel boot parameters, Kickstart files, etc.

In another embodiment, a raw disk mapping mode may be used. For example, if the media image is a raw disk image (e.g., an ISO file, an IMG file, an HDD file, etc.), then the VMO agent may map the raw image to the emulated NVMe drive as raw bytes.

In some embodiments, network interface 206 may offer additional enhancements in the context of virtual media offload. For example, network interface 206 may customize the OS installation. That is, if the media image supports the direct file copy mode mentioned above, then network interface 206 can modify the boot options, add more files, etc. to customize the OS installation process.

Further, network interface 206 may provide media integrity verification. Network interface 206 may have the computational resources and storage capacity to allow it to download the remote file and then calculate a hash value (e.g., an MD5 value) of the file locally. The calculated hash value may then be compared against a reference hash value to ensure that the file has not been tampered with, that it has been downloaded correctly, etc.

Turning now to FIG. 3, a sequence diagram shows a method of remote virtual media offload for OS deployment, according to one embodiment. First, a user may interact with a management controller to instruct it to load a media image as virtual media for OS deployment. The management controller may then, instead of providing the virtual media itself, interact with a SmartNIC to allow the SmartNIC to offload such functionality.

The SmartNIC may then download the media image into its local storage space, verify the media's integrity, and create a new emulated bootable device exposed to the host system. The new emulated bootable device may be given a name such as "Emulated NVMe" and may be mounted either by direct file copy or raw disk mapping.

The user may then, via the management controller, set the boot order of the host system with a setting such as "boot from Emulated NVMe." The user may then cause the host system to power on or reboot (e.g., by directly interacting with the host or by instructing the management controller to boot the host). The host system may then boot from the virtual media that the SmartNIC has exposed, and OS installation may proceed.

Once OS installation is complete, the emulated device may be unloaded, and in some embodiments the media image may also be deleted from the SmartNIC's on-board storage.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a host system including at least one processor; and
    a network interface;
    wherein the network interface is configured to:
        receive, from a remote information handling system, data usable for deployment of an operating system (OS);
        store the data on a local storage device of the network interface;
        verify the data by computing a hash of the data on a local processing resource of the network interface and comparing the computed hash to a reference hash; and
        mount a virtual storage resource accessible to the host system based on the local storage device, wherein the virtual storage resource includes the data, and wherein the host system is configured to boot from the virtual storage resource.

2. The information handling system of claim 1, wherein the network interface is a SmartNIC.

3. The information handling system of claim 1, wherein the virtual storage resource is configured to expose the data according to a raw disk mapping mode.

4. The information handling system of claim 1, wherein the virtual storage resource is configured to expose the data according to a direct file copy mode.

5. The information handling system of claim 4, wherein the network interface is configured to perform at least one customization of the data prior to the host system booting from the virtual storage resource.

6. The information handling system of claim 1, wherein the network interface is configured to receive the data based on instructions received from a management controller of the information handling system.

7. A method comprising:
    a network interface of a host system receiving, from a remote information handling system, data usable for deployment of an operating system (OS);
    the network interface storing the data on a local storage device of the network interface;
    the network interface verifying the data by computing a hash of the data on a local processing resource of the network interface and comparing the computed hash to a reference hash; and
    the network interface mounting a virtual storage resource accessible to the host system based on the local storage device, wherein the virtual storage resource includes the data, and wherein the host system is configured to boot from the virtual storage resource.

8. The method of claim 7, wherein the network interface is a SmartNIC.

9. The method of claim 7, wherein the virtual storage resource exposes the data according to a raw disk mapping mode.

10. The method of claim 7, wherein the virtual storage resource exposes the data according to a direct file copy mode.

11. The method of claim 10, further comprising:
    the network interface performing at least one customization of the data prior to the host system booting from the virtual storage resource.

12. The method of claim 7, wherein the network interface receives the data based on instructions received from a management controller of the information handling system.

13. An article of manufacture comprising a non-transitory, computer-readable medium having instructions thereon that are executable by a processor of a network interface of a host system for:
    receiving, from a remote information handling system, data usable for deployment of an operating system (OS);
    storing the data on a local storage device of the network interface;
    verifying the data by computing a hash of the data on a local processing resource of the network interface and comparing the computed hash to a reference hash; and mounting a virtual storage resource accessible to the host system based on the local storage device, wherein the virtual storage resource includes the data, and wherein the host system is configured to boot from the virtual storage resource.

14. The article of claim 13, wherein the network interface is a SmartNIC.

15. The article of claim 13, wherein the virtual storage resource is configured to expose the data according to a raw disk mapping mode.

16. The article of claim 13, wherein the virtual storage resource is configured to expose the data according to a direct file copy mode.

17. The article of claim 16, wherein the network interface is configured to perform at least one customization of the data prior to the host system booting from the virtual storage resource.

18. The article of claim 13, wherein the network interface is configured to receive the data based on instructions received from a management controller of the information handling system.

* * * * *